United States Patent

Lehmann et al.

Patent Number: 4,999,027
Date of Patent: Mar. 12, 1991

[54] PROCESS FOR TRICHROMATIC DYEING OR PRINTING

[75] Inventors: Urs Lehmann; Karl Hoegerle, both of Basle, Switzerland

[73] Assignee: Ciba-Geigy Corporation, Ardsley, N.Y.

[21] Appl. No.: 398,118

[22] Filed: Aug. 23, 1989

[30] Foreign Application Priority Data

Aug. 26, 1988 [CH] Switzerland ............ 3172/88

[51] Int. Cl.$^5$ ............ C09B 45/00; C09B 50/00; D06P 3/24; D06P 3/10
[52] U.S. Cl. ............ 8/543; 8/531; 8/588; 8/587; 8/917; 8/924
[58] Field of Search ............ 8/641, 543, 588, 557, 8/554, 917, 924

[56] References Cited

U.S. PATENT DOCUMENTS

| | | | |
|---|---|---|---|
| 4,325,869 | 4/1982 | Seitz et al. | 260/146 |
| 4,402,704 | 9/1983 | Raisin et al. | 8/641 |
| 4,444,564 | 4/1984 | Salathe . | |
| 4,445,905 | 5/1984 | Schaetzer et al. | 8/641 |
| 4,563,192 | 1/1986 | Salathe . | |
| 4,680,384 | 7/1987 | Seitz et al. | 534/622 |

FOREIGN PATENT DOCUMENTS

| | | |
|---|---|---|
| 0069703 | 1/1983 | European Pat. Off. . |
| 0045278 | 9/1984 | European Pat. Off. . |
| 127579 | 12/1984 | European Pat. Off. . |
| 181292 | 5/1986 | European Pat. Off. . |
| 0304926 | 8/1988 | European Pat. Off. . |
| 498916 | 12/1970 | Switzerland . |
| 1179760 | 1/1970 | United Kingdom . |

OTHER PUBLICATIONS

Venkataraman pp. 92–95 vol. VII (1974).
Textile Praxis Int., 1976, pp. 895–898.

*Primary Examiner*—A. Lionel Clingman
*Assistant Examiner*—J. Darland

*Attorney, Agent, or Firm*—George P. Dohmann; Edward McC. Roberts

[57] ABSTRACT

In the process for the trichromatic dyeing or printing of natural and synthetic polyamide fibre materials, mixtures of reactive dyes, wherein blue-dyeing reactive dyes of the formula

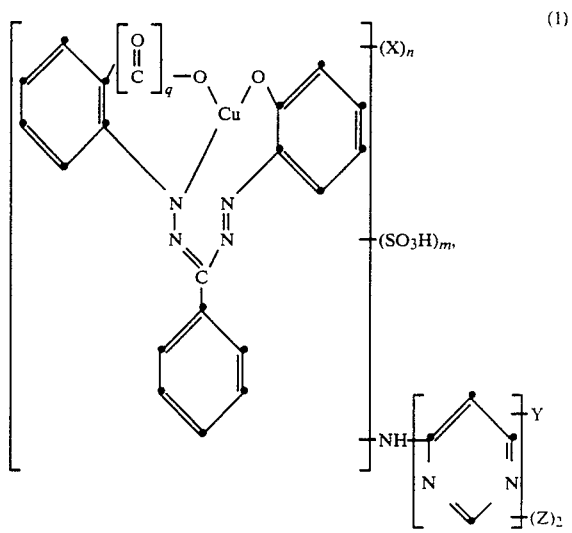

in which X is halogen, $C_1$–$C_4$alkyl, $C_1$–$C_4$alkoxy, cyano or nitro, n is the number 0, 1 or 2, q is the number 0 or 1, m is the number 1, 2 or 3, Z is halogen and Y is a CN, CHO or $S(O)_pR$ group in which p is the number 0, 1 or 2 and R is substituted or unsubstituted $C_1$–$C_8$alkyl or phenyl, are used together with sulfo-containing yellow- or orange-dyeing reactive dyes and sulfo-containing red-dyeing reactive dyes, have a uniform color build-up in combination with shade constancy in different concentrations and good compatibility.

18 Claims, No Drawings

PROCESS FOR TRICHROMATIC DYEING OR PRINTING

The present invention relates to processes for the trichromatic dyeing or printing of natural and synthetic polyamide fibre materials with mixtures of reactive dyes.

For the dyeing and printing of textile fibre materials by the trichromatic principle, inter alia, dyes are required which have uniform colour build-up in combination with shade constancy in different concentrations and good compatibility, in order to obtain dyed/printed textile fibre materials which largely meet the requirements.

This goal could not always be achieved by means of the previously used dyes/mixtures of dyes, in particular with respect to compatibility, rate of exhaustion and fixation, degree of exhaustion, levelness on the fibre and in the piece and wet fastness, and it was therefore the object of the present invention to provide improved processes for the dyeing and printing of textile polyamide fibre materials by the trichromatic principle. It has now been found that the object can be achieved according to the invention by carrying out the processes by means of mixtures of certain reactive dyes. The present invention accordingly relates to a process for the trichromatic dyeing or printing of natural and synthetic polyamide fibre materials by means of mixtures of reactive dyes, which comprises using blue-dying reactive dyes of the formula

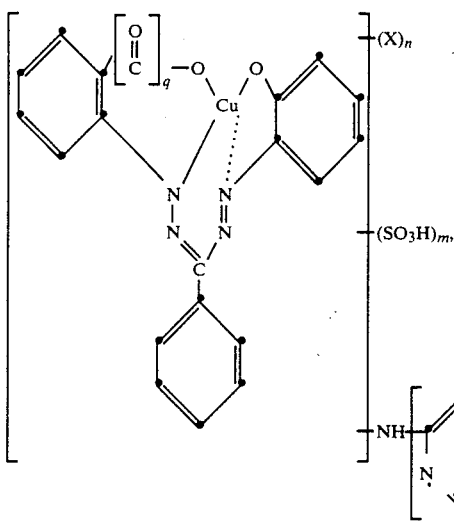

(1)

in which X is halogen, $C_1$–$C_4$alkyl, $C_1$–$C_4$alkoxy, cyano or nitro, n is the number 0, 1 or 2, q is the number 0 or 1, m is the number 1, 2 or 3, Z is halogen and Y is a CN, CHO or $S(O)_pR$ group in which p is the number 0, 1 or 2 and R is substituted or unsubstituted $C_1$–$C_8$alkyl or phenyl together with sulfo-containing yellow-or orange-dyeing reactive dyes and sulfo-containing red-dyeing reactive dyes.

X in formula (1) as halogen is, for example, fluorine, bromine or preferably chlorine.

Z in formula (1) as halogen can be bromine or preferably fluorine or chlorine.

X in formula (1) as $C_1$–$C_4$alkyl can be, for example, methyl, ethyl, propyl, isopropyl, butyl, tert-butyl, isobutyl or sec-butyl.

X in formula (1) as $C_1$–$C_4$alkoxy can be, for example, methoxy, ethoxy, propoxy, isopropoxy, butoxy, sec-butoxy or tert-butoxy.

Y in formula (1) can be preferably —$S(O)_pR$ in which p is the number 0, 1 or 2 and R is substituted or unsubstituted $C_1$–$C_8$alkyl or phenyl.

R as $C_1$–$C_8$alkyl can be, in particular, $C_1$–$C_4$alkyl, for example methyl, ethyl, propyl, isopropyl, butyl, tert-butyl, isobutyl, sec-butyl, and the corresponding radicals which are substituted, for example, by halogen, for example fluorine, chlorine or bromine, or phenyl.

n in formula (1) can be in particular the number 0.

q in formula (1) can be preferably the number 1.

m in formula (1) can be preferably the number 2.

Blue-dyeing reactive dyes of the formula (1) in which X is halogen and R is substituted or unsubstituted $C_1$–$C_8$alkyl are of interest for the process according to the invention.

Blue-dyeing reactive dyes of the formula (1) in which q is the number 1, m is the number 2 and n is the number 0 are of particular interest for the process according to the invention.

Blue-dyeing reactive dyes of the formula (1) in which X is chlorine, n is the number 1, q is the number 1, m is the number 2, Z is fluorine or chlorine and Y is —$S(O)_pR$ are preferred for the process according to the invention, suitable reactive dyes being in particular those of the formula (1) in which n is the number 0, q is the number 1, m is the number 2, Z is fluorine or chlorine and Y is —$S(O)_pR$ in which p is the number 0, 1 or 2 and R is $C_1$–$C_4$alkyl.

Blue-dyeing reactive dyes of the formula

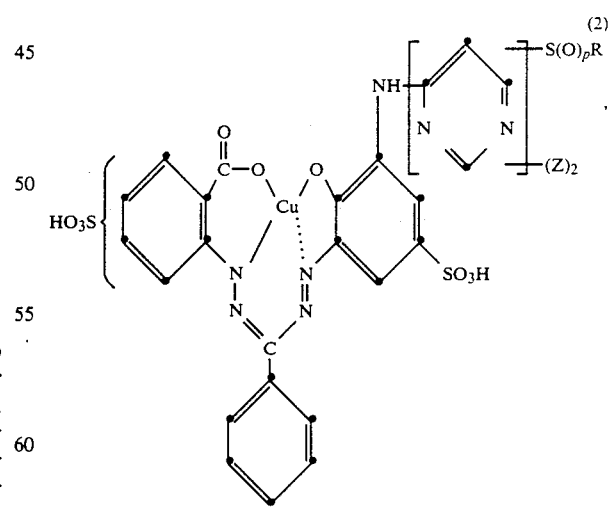

(2)

in which Z is fluorine or chlorine, p is the number 0 or 2 and R is $C_1$–$C_4$ alkyl are particularly preferred for the process according to the invention.

Blue-dyeing reactive dyes of the formula

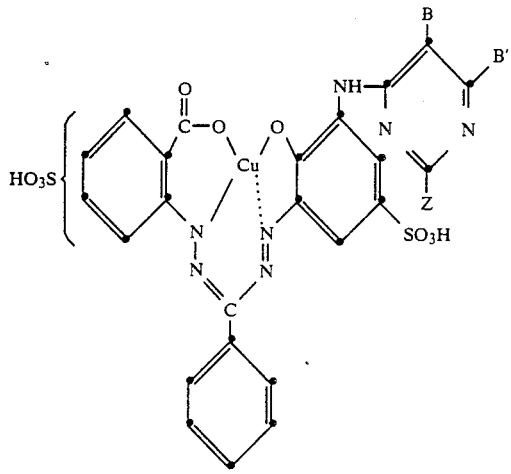 (3)

in which one of the radicals B or B' is $S(O)_pCH_3$ and the other of the radicals B or B' is fluorine or chlorine, Z is fluorine or chlorine and p is the number 0 or 2 are very particularly preferred for the process according to the invention. In this formula, B and Z or B' and Z are each chlorine or fluorine.

Blue-dyeing reactive dyes of the formulae

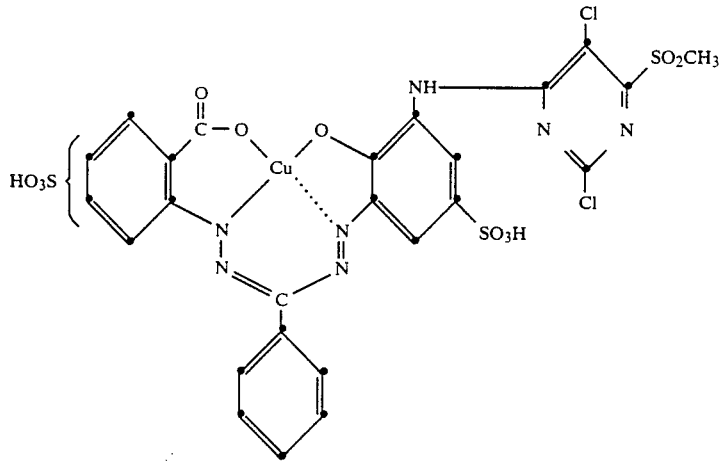 (4)

and

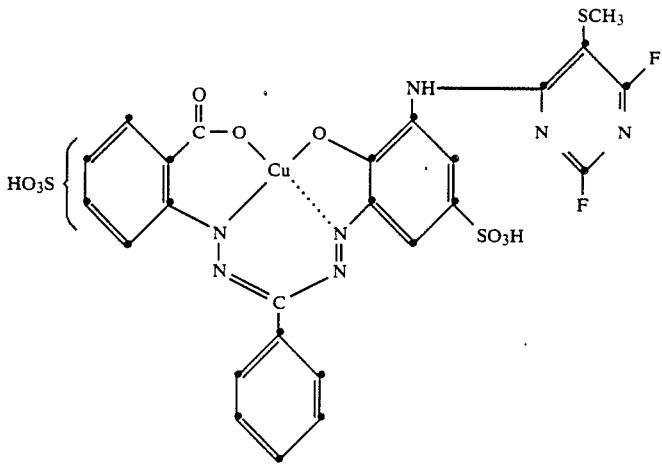 (5)

are of very particular importance.

Azo dyes are preferably used in the process according to the invention as the yellow- or orange- and red-dyeing sulfo-containing reactive dyes. In particular those yellow- or orange- and red-dyeing sulfo-containing reactive dyes as fibre-reactive group, preferably azo dyes, are used which contain a halogenotriazine or halogenopyrimidine group or a reactive group of the aliphatic series.

Difluorochloropyrimidinyl, in particular 2,4-difluoro-5-chloropyrimidin-6-yl are preferably used as halogenopyrimidine group, and $\alpha,\beta$-dihalogenopropionyl, in particular $\alpha,\beta$-dibromopropionyl, or $\alpha$-halogenoacryloyl, in particular $\alpha$-bromoacryloyl, are preferably used as reactive group of the aliphatic series.

Examples of yellow- or orange-dyeing sulfo-containing, fibre-reactive dyes which are suitable for the process according to the invention are:

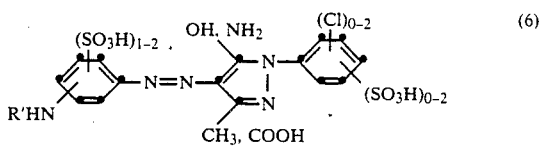 (6)

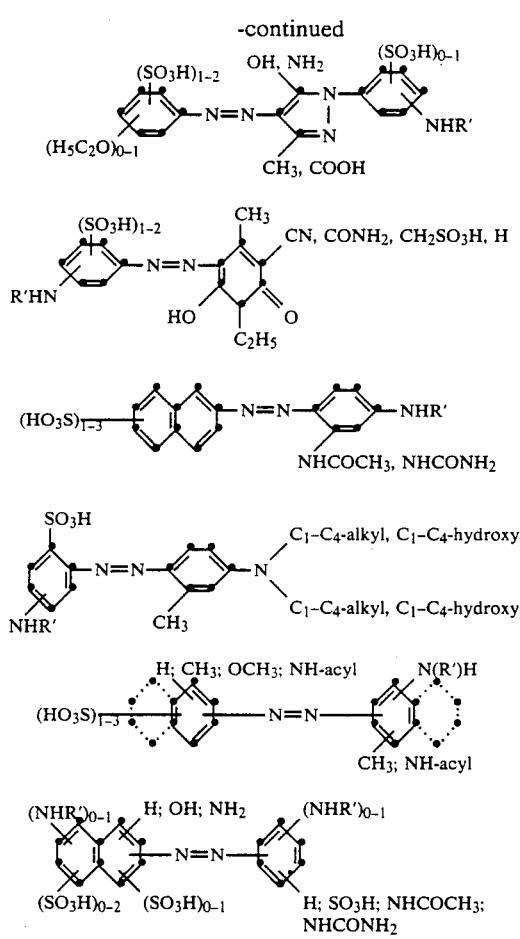

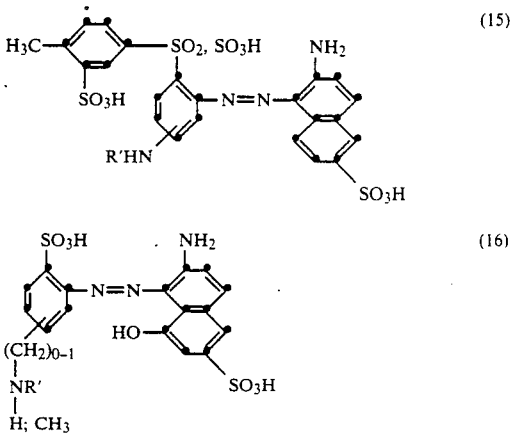

in which acyl is, for example, acetyl or substituted or unsubstituted benzoyl and the fused rings indicated by dots represent naphthalene systems which are a possible alternative and Furthermore, examples of red-dyeing sulfo-containing reactive dyes which are suitable for the process according to the invention are:

In the above formulae (6) to (16), R' is a fibre-reactive group and denotes difluorochloropyrimidinyl, in particular 2,4-difluoro-5-chloropyrimidin-6-yl, or α,β-dihalogenopropionyl, in particular α,β-dibromopropionyl, or α-halogenoacryloyl, in particular α-bromoacryloyl.

The yellow- or orange-dyeing dyes of the formulae (6) to (11) and the red-dyeing dyes of the formulae (13) to (16), the fibre-reactive group R' in formula (16) being bound to the chromophor as a

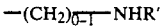

group, are of particular interest.

The yellow- or orange-dyeing reactive dyes

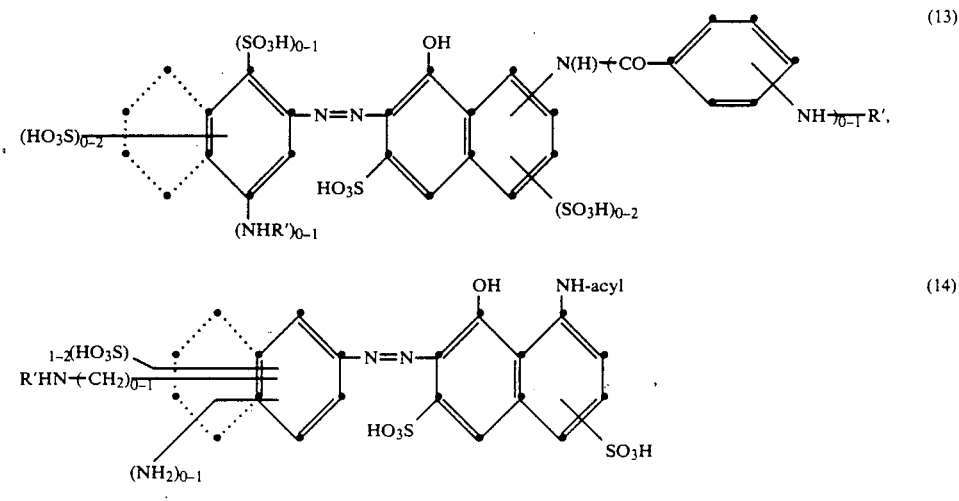

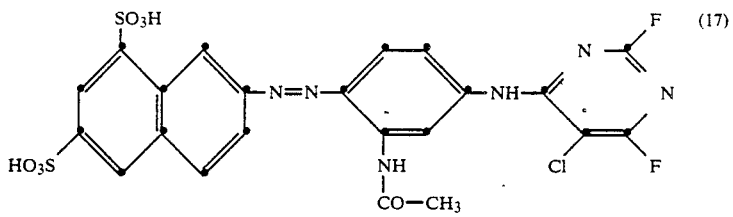

(17)

and in particular

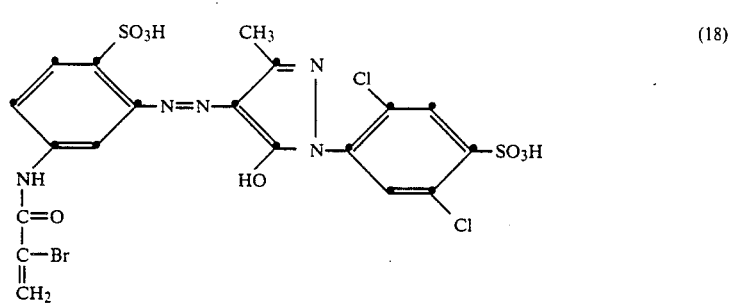

(18)

are particularly preferred for the process according to the invention.

The red-dyeing reactive dyes

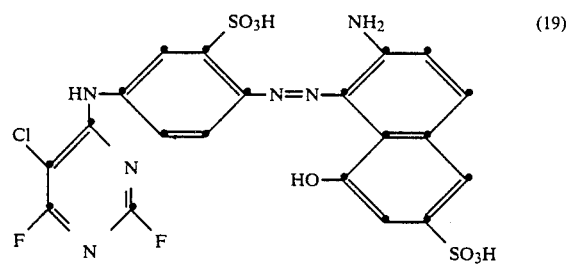

(19)

and in particular

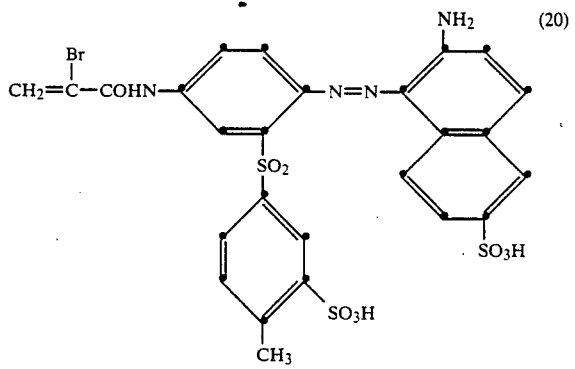

(20)

are particularly preferred for the process according to the invention.

The use of the yellow- or orange-dyeing reactive dye of the formula (18) together with the red-dyeing reactive dye of the formula (20) and at least one blue-dyeing reactive dye of the formula (1) is particularly preferred for the process according to the invention for the trichromatic dyeing or printing of natural and synthetic polyamide fibre materials.

Very particularly preferred embodiments for the process according to the invention comprise (a) using a yellow- or orange-dyeing reactive dye of the formula (18) together with a red-dyeing reactive dye of the formula (20) and a blue-dyeing reactive dye of the formula (4);

(b) using a yellow- or orange-dyeing reactive dye of the formula (18) together with a red-dyeing reactive dye of the formula (20) and a blue-dyeing reactive dye of the formula (5).

The yellow- or orange- and red-dyeing reactive dyes used for the process according to the invention for the trichromatic dyeing or printing are known per se and can be prepared in analogy to known dyes.

The reactive dyes are present either in the form of their free sulfonic acid or as salts thereof.

Examples of suitable salts are the alkali metal salts, alkaline earth metal salts or ammonium salts or the salts of an organic amine. Examples are the sodium salts, lithium salts, potassium salts or ammonium salts or the salt of triethanolamine.

The reactive dyes of the formula (1) can be prepared by a process which comprises reacting a compound of the formula

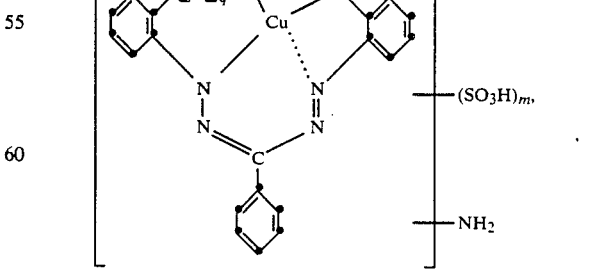

(21)

in which q, X, n and m are as defined in formula (1) with a compound which introduces the radical of the formula

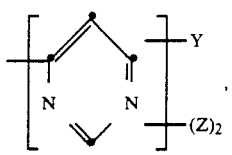

(22)

in which Y and Z are as defined in formula (1).

Suitable compounds which introduce the radical of the formula (22) are compounds of the formula

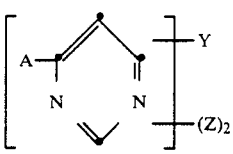

(23)

in which A is halogen, preferably fluorine or chlorine, Z is halogen, in particular fluorine or chlorine, and Y is a CN, CHO or preferably a $S(O)_pR$ group in which p is the number 0, 1 or 2 and R is substituted or unsubstituted $C_1$-$C_8$alkyl, preferably $C_1$-$C_4$alkyl, or phenyl. Examples of compounds of the formula (22) are

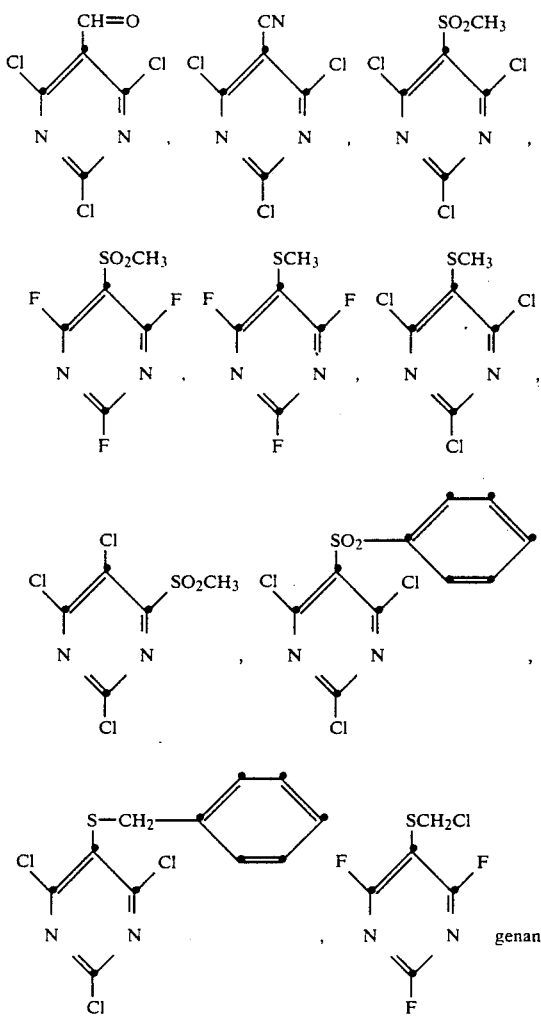

genannt.

The compounds of the formula (21) are known per se and can be prepared in analogy to known compounds.

Some of the compounds of the formula (23) are known and can be prepared in analogy to known compounds.

Compounds of the formula (23) in which A and Z are halogen, Y is an SR group and R is halogen- or phenyl-substituted $C_1$-$C_8$alkyl can be obtained, for example, by reacting barbituric acid with a compound of the formula $$(R'')_2SO \qquad (24)$$

in which R'' is unsubstituted or halogen- or phenyl-substituted $C_1$-$C_8$-alkyl in the presence of acetic anhydride, followed by reaction of the reaction product with halogen compounds of phosphorus in the presence of a catalyst at a temperature of 80° to 180° C.

In the case that R'' is unsubstituted $C_1$-$C_8$alkyl, the radical R'' can subsequently be halogenated. Furthermore, any non-fluorine halogen bound to the pyrimidine ring can be exchanged for fluorine.

Examples of compounds of the formula (24) are dimethyl, diethyl, dipropyl, diisopropyl, dibutyl, di-tert-butyl, di-sec-butyl, diisobutyl, dibenzyl or diphenethyl sulfoxide.

The reaction of barbituric acid with compounds of the formula (24) in the presence of acetic anhydride is preferably carried out in organic solvents, for example acetonitrile, at temperatures of, for example, 60° to 120° C.

Examples of suitable halogen compounds of phosphorus are phosphorus pentachloride, phosphorus trichloride or in particular phosphorus oxychloride. The reaction with halogen compounds of the phosphorus is preferably carried out at temperatures between 100° and 130° C. Examples of suitable catalysts are pyridine, triethylamine, tripropylamine, diethylaniline or in particular dimethylaniline.

A suitable halogenation reaction for the radical R'' which is as defined above is, for example, a chlorination which is carried out by means of chlorinating agents, for example chlorine gas, in organic solvents, for example carbon tetrachloride, at low temperatures, for example $-40°$ to $+5°$ C.

The exchange of the halogen bound to the pyrimidine ring for fluorine is carried out by means of fluorinating agents, for example hydrogen fluoride, sodium fluoride, potassium fluoride or preferably a potassium fluoride/calcium fluoride mixture whose ratio is in particular 1:1 in organic solvents, for example sulfolane or preferably acetonitrile, at temperatures of, for example, 50° to 100° C.

The condensation of the chromophor of the formula (21) with the compound which introduces the radical of the formula (22) is carried out preferably in aqueous solution, emulsion or suspension, at low temperature, for example 0° to 40° C., and at a weakly acidic, neutral to weakly alkaline pH. Advantageously, the hydrogen halide which is liberated during the condensation is continuously neutralized by addition of aqueous alkaline metal hydroxides, alkali metal carbonates or alkali metal bicarbonates.

The reactive dyes of the formula (1) are distinguished by good levelness on the fibre and in the piece and in general a high fastness level.

For the process according to the invention, the amounts in which the reactive dyes of the formula (1)

and the yellow- or orange- and red-dyeing reactive dyes are used in the dye baths or printing pastes can vary within wide limits, depending on the desired depth of shade; in general, amounts of 0.01 to 10% by weight, in particular 2 to 10% by weight, relative to the material to be dyed or the printing paste, have proven to be advantageous.

Fibre material made of natural polyamides, in particular wool, are preferably used for the process according to the invention.

Special equipment is not necessary in the process according to the invention. The customary dyeing and printing apparatuses and machines, for example for loose fibre, tops, yarn in hank form, wound packages, piece goods and carpets, can be used.

The aqueous dye bath can contain, in addition to the reactive dye, other customary auxiliaries, in particular levelling auxiliaries. The levelling auxiliaries are used in an amount of 0.3 to 3% by weight, relative to the fibre material.

Further auxiliaries which can be contained in the dye bath are mineral acids, such as sulfuric acid, sulfamic acid or phosphoric acid, organic acids, advantageously lower aliphatic carboxylic acids, such as formic acid, acetic acid or maleic acid. The main function of the acids is to adjust the pH of the liquors used according to the invention.

The pH of 3 to 6 is preferably adjusted by means of an organic acid, in particular formic acid or acetic acid.

The dyeing is preferably carried out at a pH of 4 to 6, in particular 4.2 to 5.5.

The dye liquor can further contain various salts, in particular ammonium salts or alkali metal salts, such as, for example ammonium sulfate or sodium sulfate, as auxiliaries.

The liquor ratio can be selected within a wide range, for example from 6:1 to 80:1, preferably 10:1 to 50:1.

The dyeing is carried out from an aqueous liquor by the exhaust method, for example at a temperature between 80° and 105° C., or between 80° and 110° C., with the use of a wool-protecting agent which eliminates formaldehyde, preferably between 98° and 103° C.

The dyeing time is usually 30 to 90 minutes.

The dyes are fixed on the fibre material by methods known per se.

A particularly preferred embodiment of the process according to the invention comprises allowing the dye liquor, after the dyeing at preferably 98° to 103° C, to cool to about 75° to 90° C. and adjusting the pH to 8 to 9, preferably to about 8.5. The pH can be adjusted by conventional agents, for example alkali metal hydroxide solutions and in particular by aqueous ammonia solution of standard concentration, for example containing 25% by weight of ammonia.

The process according to the invention for the trichromatic dyeing or printing is distinguished by good levelness on the fibre and in the piece and good wet fastness properties of the dyeings and prints obtained. The mixtures of reactive dyes used for the process according to the invention are distinguished by a high and uniform degree of exhaustion, good compatibility and a uniform rate of exhaustion and fixation of the dye components.

In the examples below, parts are by weight. The temperatures are degrees centigrade. Parts by weight relate to parts by volume as the gram relates to the cubic centimeter.

PREPARATION PROCEDURES

Example 1

9.18 parts of 2,4,6-trichloro-5-methylthiopyrimidine are dissolved in 60 parts of dry carbon tetrachloride, and 7.2 parts of chlorine gas are passed into this solution at −20° over a period of 2 hours. The solution is then heated to 45°, maintained at this temperature for 2 hours, flushed with inert gas and distilled. This gives 10.1 parts of the compound of the formula

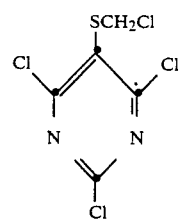
(101)

Example 2

57 parts of dried acetonitrile are initially introduced. 46 parts of a potassium fluoride/calcium fluoride 1:1 mixture which has been dried at 150° in a high vacuum and 5.02 parts of the compound prepared according to Example 1 are then added.

The suspension is heated to reflux for 28 hours with stirring, then cooled to room temperature, filtered, the residue is washed with dry acetonitrile, and the filtrate is distilled. This gives 2.28 parts of the compound of the formula

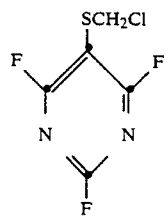
(102)

Example 3

60 parts of acetic acid (98–100%) and 18.9 parts of acetic anhydride are initially introduced. 17.42 parts of dried barbituric acid are then added to this solution, and 40.76 parts of dibenzyl sulfoxide are rapidly poured into the resulting suspension.

The suspension is heated to 90° over a period of 2 hours, and maintained at 90° to 100° for 4 hours. The precipitate obtained is filtered off at room temperature, washed with 50 parts of water and then with 40 parts of acetone, and dried at 40° in vacuo. This gives 38.5 parts of an intermediate. 90 parts of phosphorus oxychloride are initially introduced, and 6.94 parts of N,N-dimethylaniline are added dropwise. 38.5 parts of the intermediate obtained by the above procedure are then stirred into this solution. The suspension is then heated and refluxed for 17 hours. After cooling to room temperature, excess phosphorus oxychloride is distilled off, the viscous residue is poured into 60 parts of water, and the temperature of the suspension maintained at 25° to 30°.

The suspension is then extracted with chloroform, the chloroform is separated off, and the reaction product is distilled in a high vacuum. This gives 24.58 parts of the compound of the formula

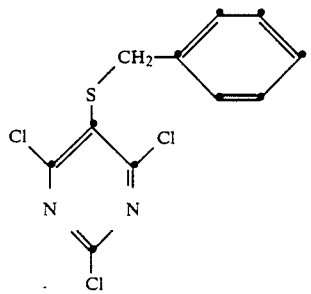
(103)

Example 4

The procedure of Example 2 is repeated, except that an equimolar amount of the compound of the formula (103) is used instead of 5.02 parts of the compound of the formula (101), to give the compound of the formula

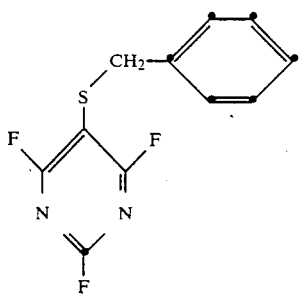
(104)

Example 5

6.62 parts of the chromophor of the formula

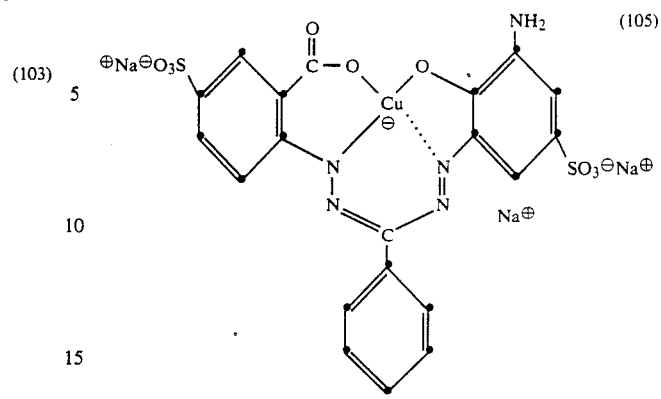
(105)

are stirred into 50 parts of water. Hydrochloric acid is added to establish a pH of 7.

2.75 parts of the compound of the formula

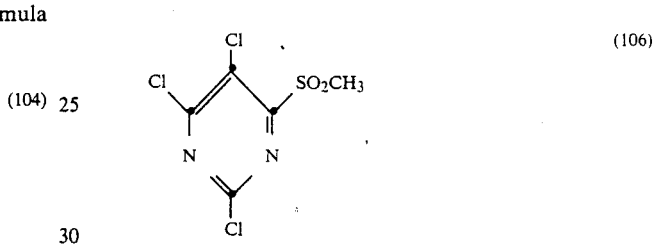
(106)

dissolved in 40 parts of acetone, are then added. The pH is maintained at a value of 7 to 7.5 by addition of aqueous sodium hydroxide solution. The reaction solution is then stirred at 40° and at a pH of 7 to 7.5 for 8 hours, filtered, and sodium chloride is added. The precipitated dye is filtered off, washed with sodium chloride solution and dried at 60° to 70°.

This gives 8.6 parts of a dye which conforms to the formula

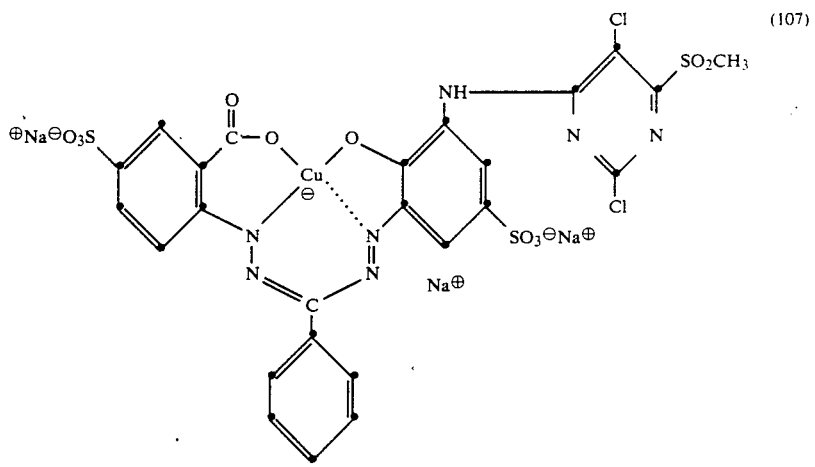
(107)

The dye obtained dyes wool in blue shades which have good fastness properties.

Example 6

The procedure as described in Example 5 is repeated, except that 2.4 parts of the compound of the formula

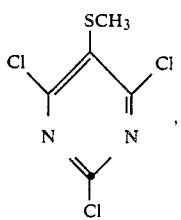 (108)

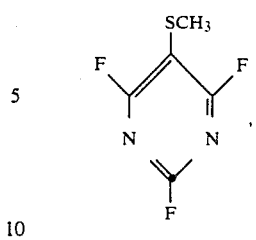 (110)

are used instead of 2.75 parts of the compound of the formula (106), to give 10.8 parts of a dye which conforms to the formula

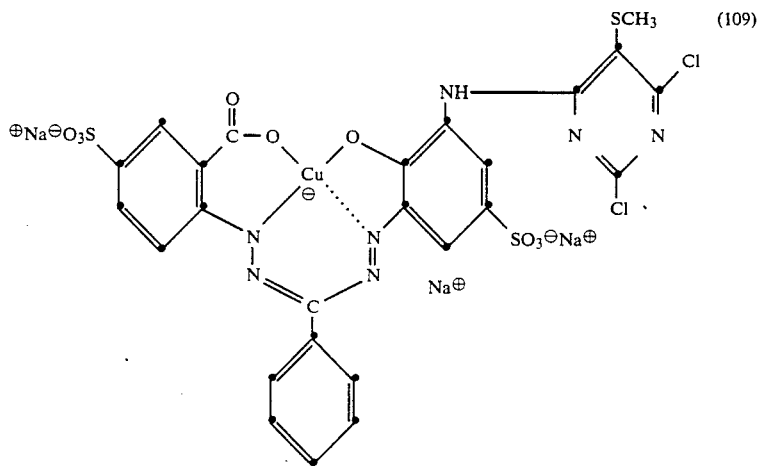 (109)

The dye obtained dyes wool in blue shades which have good fastness properties.

Example 7

6.62 parts of the chromophor of the formula (105) from Example 5 are stirred into 50 parts of water. Hydrochloric acid is added to establish a pH of 7.

At 0° to 5°, 2.1 parts of the compound of the formula dissolved in 15 parts of acetone, are then added over a period of 3 minutes. The pH is maintained at a value of 6 to 7 by addition of sodium hydroxide solution. The temperature is slowly increased to room temperature, while maintaining the pH at 6 to 7.

Sodium chloride is then added to the reaction solution, the precipitated dye is filtered off and dried at 60° to 70°.

This gives 9.5 parts of a dye which conforms to the formula

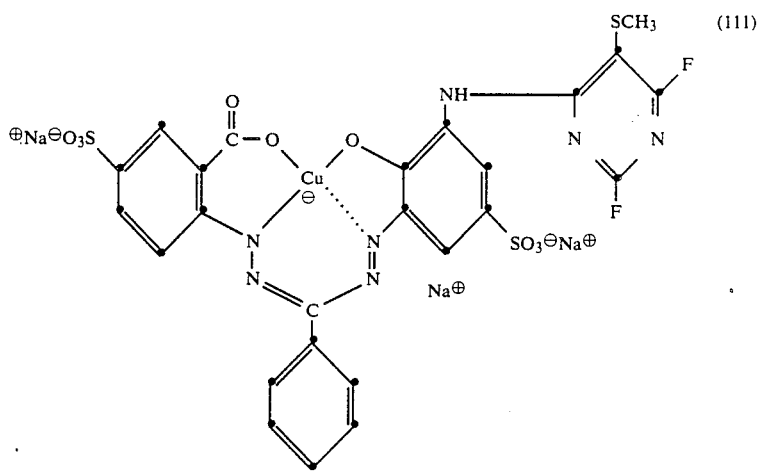 (111)

The dye obtained dyes wool in blue shades which have good fastness properties.

Examples 8 to 14

The procedure as described in Example 7 is repeated, except that an equimolar amount of the compounds listed in column 2 of Table 1 below are used instead of 2.1 parts of the compound of the formula (110), to give the dyes listed in column 3 in which FA is a radical of the formula

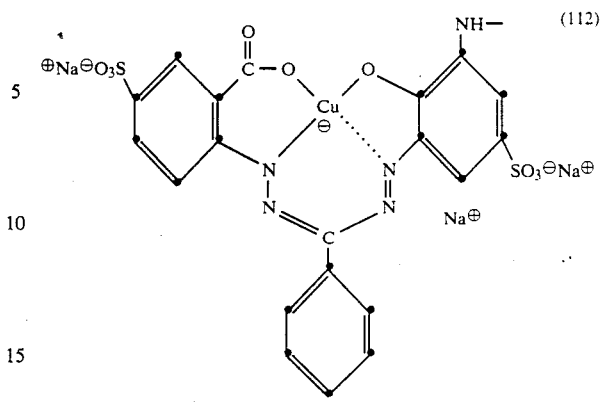

The dyes listed in column 3 of Table 1 dye wool in the hues listed in column 4 of Table 1.

TABLE 1

| Ex. | Pyrimidine compound | Dye | Hue on wool |
|---|---|---|---|
| 8 | CH=O, Cl, Cl, N, N, Cl | CH=O, FA, Cl, N, N, Cl (113) | blue |
| 9 | CN, Cl, Cl, N, N, Cl | CN, FA, Cl, N, N, Cl (114) | blue |
| 10 | SO₂CH₃, Cl, Cl, N, N, Cl | SO₂CH₃, FA, Cl, N, N, Cl (115) | blue |
| 11 | SO₂CH₃, F, F, N, N, F | SO₂CH₃, FA, F, N, N, F (116) | blue |

TABLE 1-continued

| Ex. | Pyrimidine compound | Dye | Hue on wool |
|---|---|---|---|
| 12 | 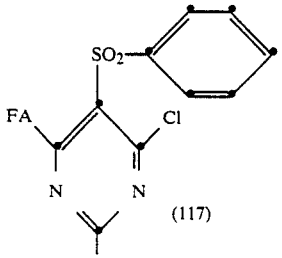 | (117) | blue |
| 13 | 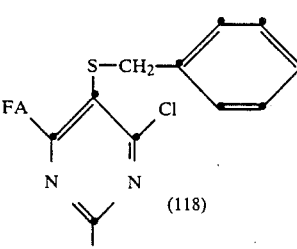 | (118) | blue |
| 14 | 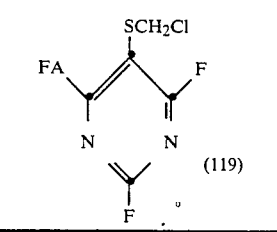 | (119) | blue |

Examples 15 and 16

The procedure as described in Examples 5 and 6 is repeated, except that 6.62 parts of a chromophor of the formula are used instead of 6.62 parts of a chromophor of the formula (105), to give the dyes listed in column 3 of Table 2 in which FA' is a radical of the formula

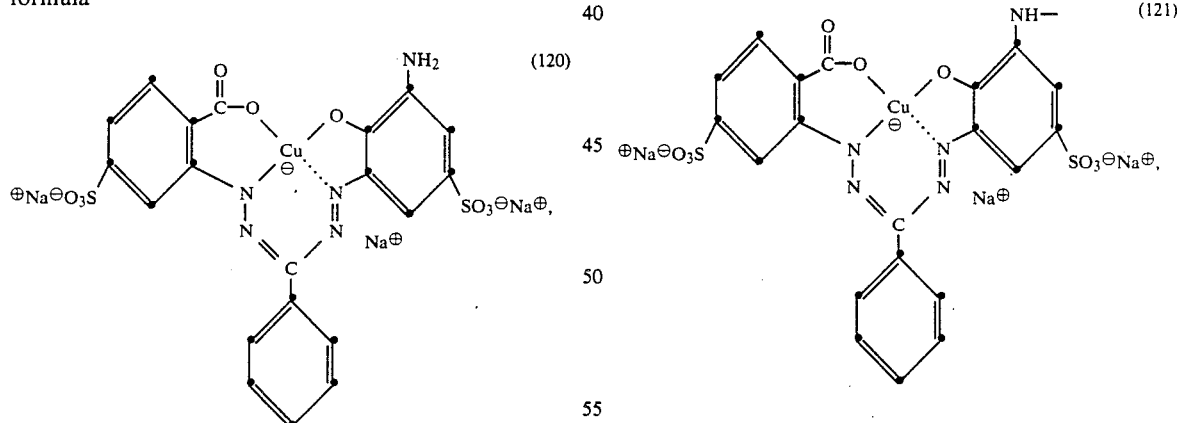

The dyes obtained dye wool in the hues listed in column 4 of Table 2.

TABLE 2

| Ex. | Pyrimidine compound | Dye | Hue on wool |
|---|---|---|---|
| 15 | 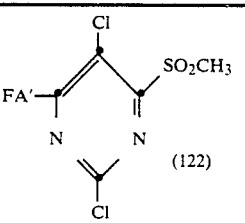 | (122) | blue |

TABLE 2-continued

| Ex. | Pyrimidine compound | Dye | Hue on wool |
|---|---|---|---|
| 16 | 2,4-dichloro-5-(methylthio)-6-chloromethyl pyrimidine with SCH₃, Cl, Cl, N, N, Cl substituents | FA'-substituted analog (123) | blue |

Examples 17 to 24

The procedure as described in Examples 7 to 14 is repeated, except that 6.62 parts of a chromophor of the formula (120) from Examples 15 and 16 are used instead of 6.62 parts of a chromophor of the formula (105), to give the dyes listed in column 3 of Table 3 in which FA' is a radical of the formula (121). The dyes obtained dye wool in the hues listed in column 4 of Table 3.

TABLE 3

| Ex. | Pyrimidine compound | Dye | Hue on wool |
|---|---|---|---|
| 17 | SCH₃, F, F, N, N, F pyrimidine | FA'-substituted analog (124) | blue |
| 18 | CH=O, Cl, Cl, N, N, Cl pyrimidine | FA'-substituted analog (125) | blue |
| 19 | CN, Cl, Cl, N, N, Cl pyrimidine | FA'-substituted analog (126) | blue |
| 20 | SO₂CH₃, Cl, Cl, N, N, Cl pyrimidine | FA'-substituted analog (127) | blue |
| 21 | SO₂CH₃, F, F, N, N, F pyrimidine | FA'-substituted analog (128) | blue |

TABLE 3-continued

| Ex. | Pyrimidine compound | Dye | Hue on wool |
| --- | --- | --- | --- |
| 22 | | | blue |
| 23 | | | blue |
| 24 | | | blue |

Dyeing Example 1

4 parts of 80% acetic acid, 2 parts of the ammonium salt of the sulfuric monoester of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 4000 parts of water of 50°.

0.35 part of the dye obtained according to Example 5 and 0.30 part of the yellow dye of the formula

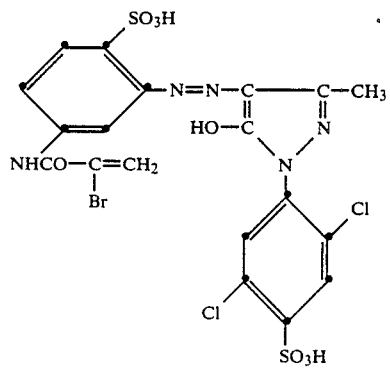
(132)

and 0.40 part of the red dye of the formula

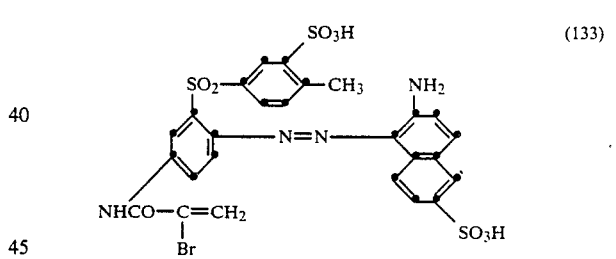
(133)

are dissolved in 100 parts of hot water, and the solution is added to the above dye bath, which is then entered with 100 parts of prewetted wool fabric. The temperature of the bath is increased from 50° to 80° over a period of 30 minutes. After dyeing at 80° for 20 minutes, the bath is heated to boiling, and dyeing is then carried out at the boiling temperature for 90 minutes. The dye is absorbed almost completely by the substrate. After the bath has been cooled to 80°, the pH of about 4.5 is increased to a constant value of 8.5 by addition of ammonia solution, and the dye material is aftertreated at this temperature for 20 minutes. After thoroughly rinsing with hot and cold water, acidification with 1 part of 80% formic acid, centrifugation and drying, a level dark brown wool fabric is obtained, which has very good wet and crock fastness and excellent light fastness.

Dyeing Examples 2 to 11

The procedure as described in Dyeing Example 1 is repeated, except that a mixture of dyes which contains the dyes listed in column 2 of Table 4 in the form of the free acids in the amounts mentioned is used instead of 0.35 part of the dye of the formula (107) according to Example 5, 0.30 part of the yellow dye of the formula (132) and 0.40 part of the red dye of the formula (133), to give a wool fabric dyed in the hues listed in column 3 of Table 4.

TABLE 4

| Dyeing Example | Dye mixture | Hue on wool |
|---|---|---|
| 2 | 0.04 part of the blue dye of the formula 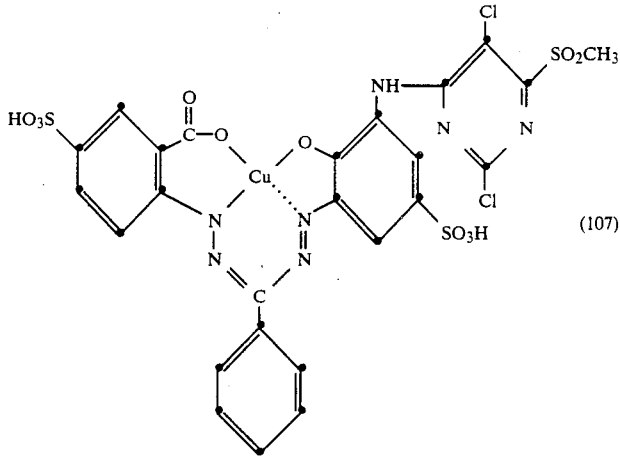 (107) 0.1 part of the orange dye of the formula 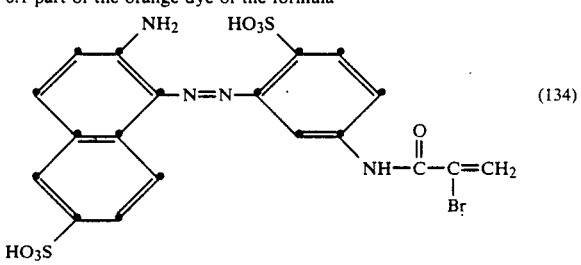 (134) and 0.03 part of the red dye of the formula 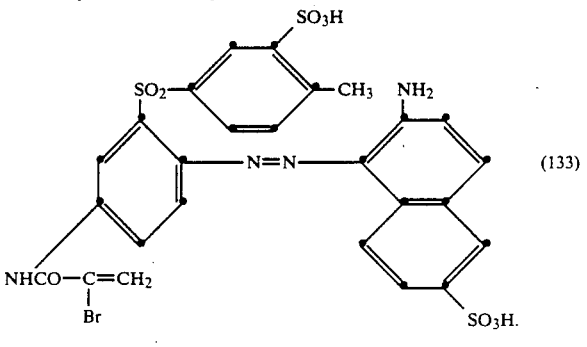 (133) | beige |
| 3 | 0.1 part of the blue dye of the formula | light brown |

TABLE 4-continued

| Dyeing Example | Dye mixture | Hue on wool |
|---|---|---|

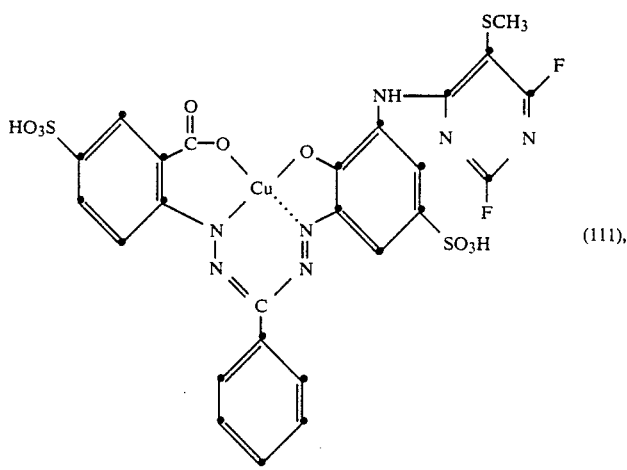
(111), 0.25 part of the orange dye of the formula (134) and
0.05 part of the red dye of the formula (133).

| | | |
|---|---|---|
| 4 | 0.8 part of the blue dye of the formula (107), 1.8 part of the orange dye of the formula | brown |

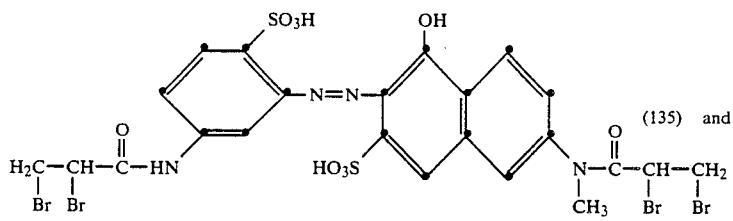
(135) and 0.7 part of the red dye of the formula (133).

| | | |
|---|---|---|
| 5 | 0.9 part of the blue dye of the formula (111), 0.75 part of the orange dye of the formula (135) and 1.35 part of the red dye of the formula (133). | brown |
| 6 | 0.4 part of the blue dye of the formula (107), 0.9 part of the yellow dye of the formula | brown |

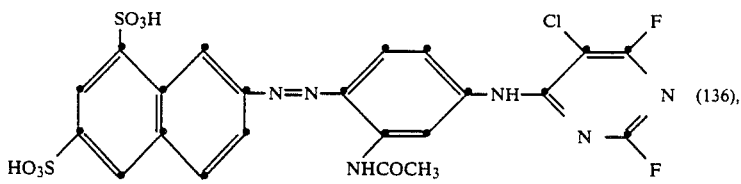
(136), 0,06 part of the orange dye of the formula

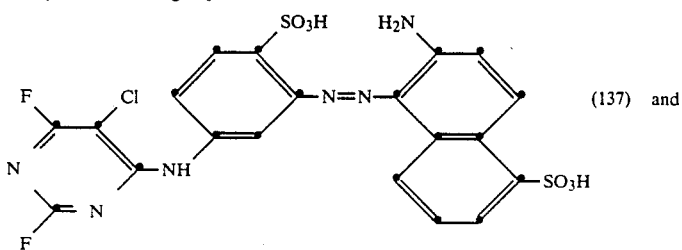
(137) and 0,24 part of the red dye of the formula

TABLE 4-continued

| Dyeing Example | Dye mixture | Hue on wool |
|---|---|---|
| | [Structure of formula (138): a pyrimidine ring with F, F, Cl substituents connected via N-CH$_2$-N(CH$_3$) to a phenyl group bearing SO$_3$H, which is azo-linked (N=N) to a naphthalene bearing NH$_2$, OH, and SO$_3$H groups] (138). | |
| 7 | 1.5 part of the blue dye of the formula (111), 2 part of the yellow dye of the formula (136), 0.1 part of the orange dye of the formula (137) and 0.7 part of the red dye of the formula (138). | dark brown |
| 8 | 0.8 part of the blue dye of the formula (107), 1.8 part of the yellow dye of the formula [Structure of formula (139): a pyrimidine with F, F substituents linked via NH to a chloro-substituted vinyl group attached to a phenyl ring bearing SO$_3$H, azo-linked (N=N) to a pyrazole with CH$_3$ and OH, which is N=N linked to a dichlorophenyl-SO$_3$H group] (139), 0.15 part of the orange dye of the formula (137) and 0.55 part of the red dye of the formula (138). | brown |
| 9 | 0.9 part of the blue dye of the formula (111), 0.75 part of the yellow dye of the formula (139), 0.3 part of the orange dye of the formula (137) and 1,05 part of the red dye of the formula (138). | brown |
| 10 | 0,04 part of the blue dye of the formula (111), 0,1 part of the yellow dye of the formula [Structure of formula (140): a disulfonated naphthalene (HO$_3$S, SO$_3$H) azo-linked (N=N) to a phenyl ring bearing NH-C(=O)-NH$_2$ (urea group), which is connected via NH to a pyrimidine bearing SCH$_3$, F, and F substituents] (140) and 0,03 part of the red dye of the formula (133). | beige |
| 11 | 1,5 part of the blue dye of the formula (107) 2 part of the yellow dye of the formula [Structure of formula (141): a disulfonated naphthalene (HO$_3$S, SO$_3$H) azo-linked (N=N) to a phenyl ring bearing NH-C(=O)-NH$_2$ (urea group), which is connected via NH to a pyrimidine bearing Cl, SO$_2$CH$_3$, and Cl substituents] (141) and | dark brown |

TABLE 4-continued

| Dyeing Example | Dye mixture | Hue on wool |
|---|---|---|
| | 0,8 part of the red dye of the formula (133). | |

Dyeing Examples 12 to 17

The procedure as described in Dyeing Example 1 is repeated, except that an equimolar amount of one of the dyes obtained according to Examples 7 to 10, 18 and 20 is used instead of 0.35 part of the dye obtained according to Example 5, to give a dark brown wool fabric.

Dyeing Example 18

4 parts of 80% acetic acid, 2 parts of the ammonium salt of the sulfuric monoester of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 1000 parts of water of 50°.

0.5 part of the dye obtained according to Example 7 and 0.09 part of the yellow dye of the formula

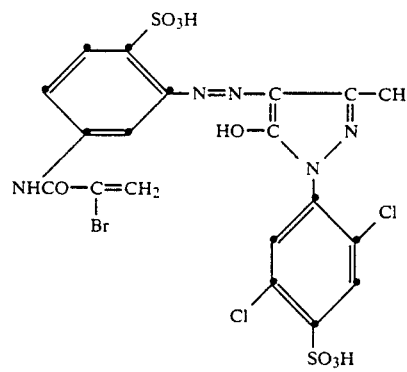
(132)

and 0.2 part of the red dye of the formula

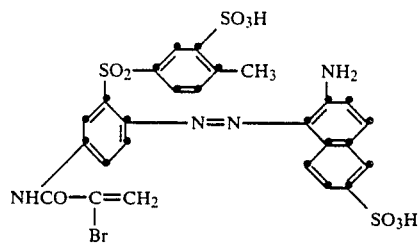
(133)

are dissolved in 100 parts of hot water, and the solution is added to the above dye bath. A circulation dyeing machine is charged with 100 parts of prewetted tops in wound form. The temperature of the bath is increased from 50 to 97-99° over a period of 30 minutes. The bath is heated to boiling, and dyeing is then carried out at the boiling temperature for 90 minutes. The dye is absorbed almost completely by the substrate. After the bath has been cooled to 80°, the pH of about 4.5 is increased to a constant value of 8.5 by addition of ammonia solution, and the dye material is aftertreated at this temperature for 20 minutes. After thoroughly rinsing with hot and cold water, acidification with 1 part of 80% formic acid, centrifugation and drying, a grey dyed material is obtained, which has very good wet fastness and excellent light fastness.

What is claimed is:

1. A process for the trichromatic dyeing or printing of natural and synthetic polyamide fibre material by means of mixtures of reactive dyes, which comprises treating these fibre materials with a dye liquor or printing paste which contains a blue-dyeing reactive dye of the formula

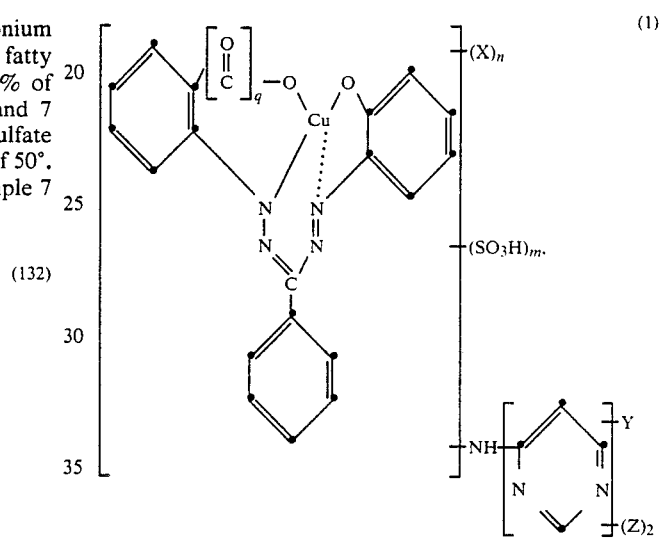
(1)

in which X is halogen, $C_1$-$C_4$alkyl, $C_1$-$C_4$alkoxy, cyano or nitro, n is the number 0, 1 or 2, q is the number 0 or 1, m is the number 1, 2 or 3, Z is halogen and Y is a CN, CHO or $S(O)_pR$ group in which p is the number 0, 1 or 2 and R is phenyl or $C_1$-$C_8$alkyl which is unsubstituted or substituted by halogen or phenyl, together with at least one yellow- or orange-dyeing sulfo-containing reactive dye of the formulae

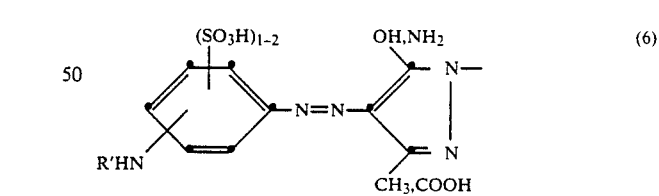
(6)

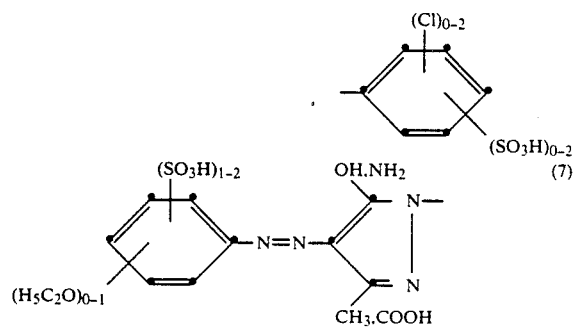
(7)

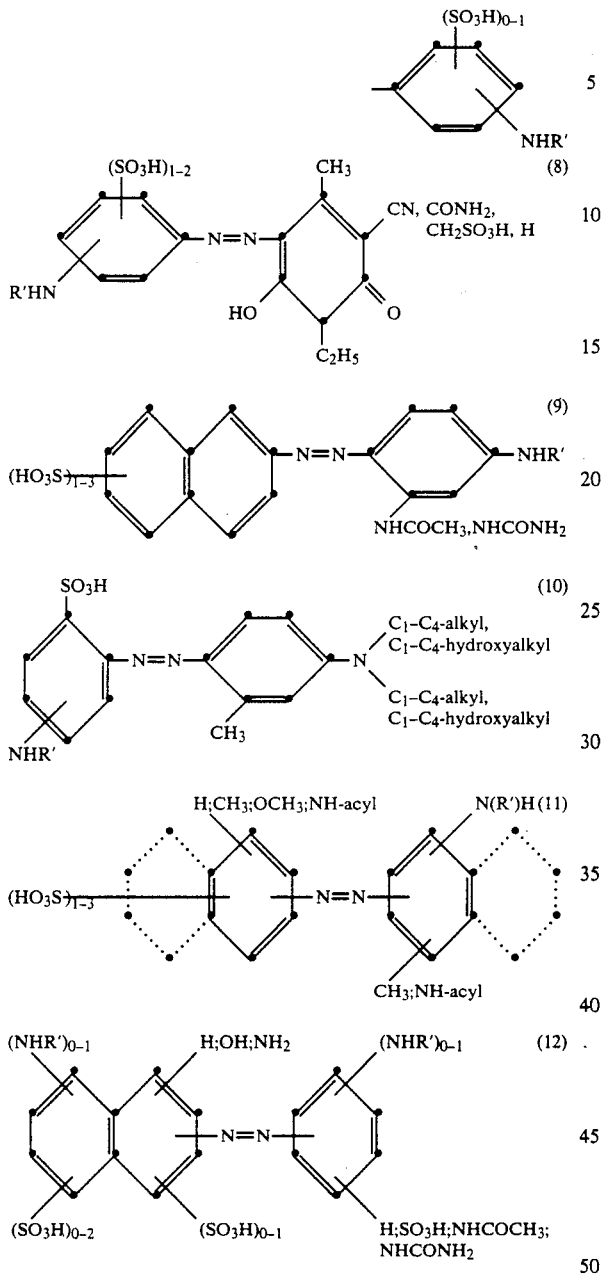

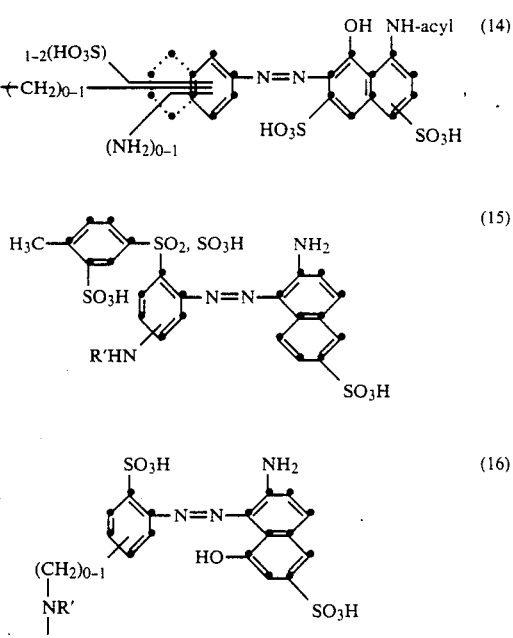

and at least one red-dyeing sulfo-containing reactive dye of the formulae

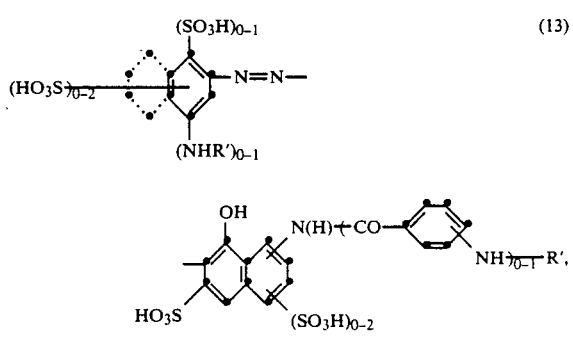

in which acyl is acetyl or benzoyl, R' is difluorochloropyrimidinyl, α,β-dihalogenopropionyl or α-halogenoacryloyl, and the fused rings indicated by dots represent naphthalene systems which are a possible alternative.

2. A process according to claim 1, wherein R' is 2,4-difluoro-5-chloropyrimidin-6-yl, α,β-dibromopropionyl or α-bromoacryloyl.

3. An aqueous dye liquor or printing paste, which contains yellow- or orange-, red- and blue-dyeing reactive dyes according to claim 1 in amounts of 0.01 to 10% by weight, relative to the fibre material to be dyed or relative to the printing paste.

4. A process according to claim 1, wherein the fibre material used is natural or synthetic polyamide material.

5. The natural or synthetic polyamide fibre material dyed or printed by the process according to claim 1.

6. A process according to claim 1, wherein q is the number 1, n is the number 0 and m is the number 2.

7. A process according to claim 1, wherein Z is fluorine or chlorine.

8. A process according to claim 1, wherein Y is a $S(O)_pR$ group, in which R is phenyl or $C_1-C_4$alkyl which is unsubstituted or substituted by halogen or phenyl and p is the number 0, 1 or 2.

9. A process according to claim 1, wherein blue-dyeing reactive dyes of the formula

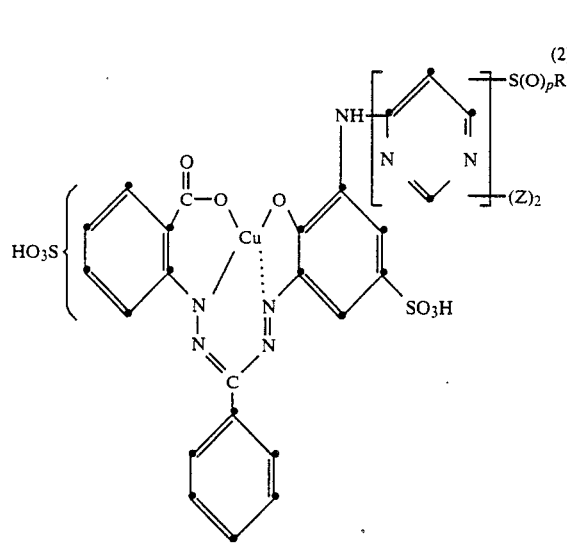

in which Z is fluorine or chlorine, p is the number 0 or 2 and R is $C_1$-$C_4$alkyl, are used.

10. A process according to claim 1, wherein blue-dyeing reactive dyes of the formula

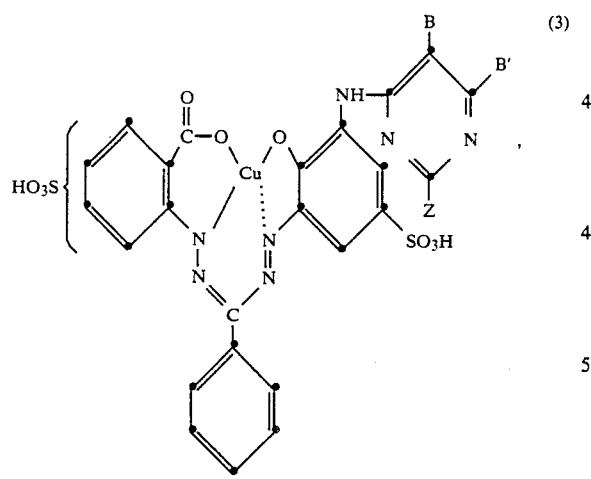

in which one of the radicals B or B' is —$S(O)_p CH_3$ and the other of the radicals B or B' is fluorine or chlorine, Z is fluorine or chlorine, p is the number 0 or 2, B and Z or B' and Z are each chlorine or fluorine, are used.

11. A process according to claim 1, wherein blue-dyeing reactive dyes of the formula

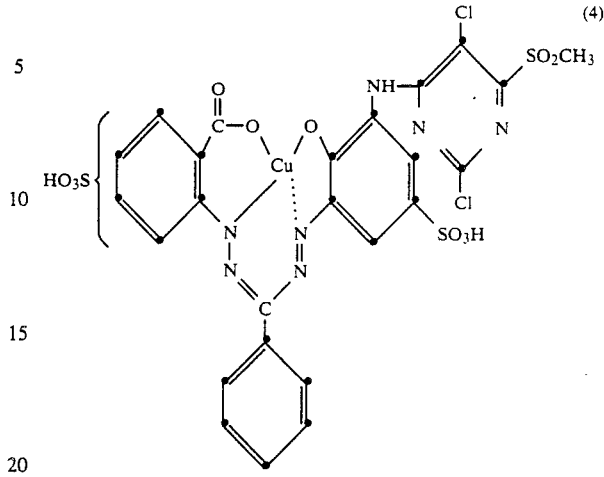

are used.

12. A process according to claim 1, wherein blue-dyeing reactive dyes of the formula

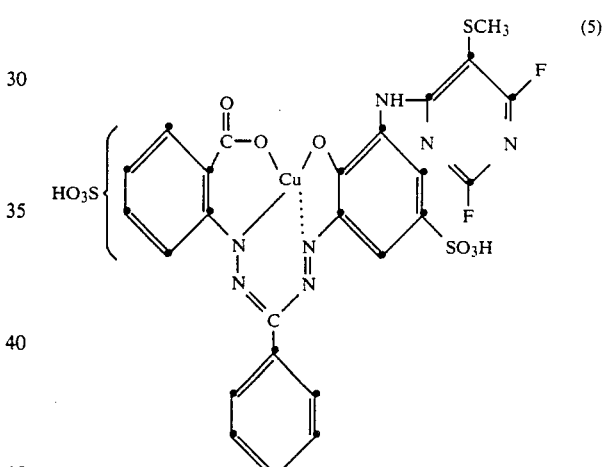

are used.

13. A process according to claim 1, wherein the yellow-or orange-dyeing reactive dye used is the dye of the formula

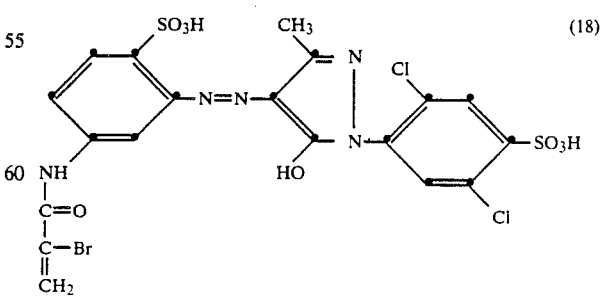

14. A process according to claim 1, wherein the red-dyeing reactive dye used is the dye of the formula 15. A process according to claim 11, wherein the yellow- or orange-dyeing reactive dye of the formula

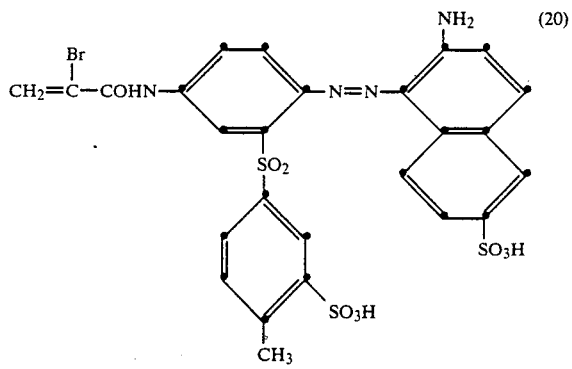

(18)

is used together with the red-dyeing reactive dye of the formula (20)

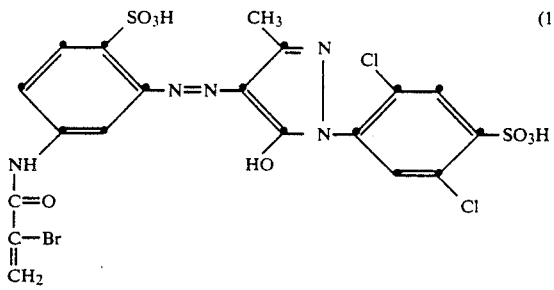

and a blue-dyeing reactive dye of the formula (4).

16. A process according to claim 12, wherein the yellow- or orange-dyeing reactive dye of the formula (18)

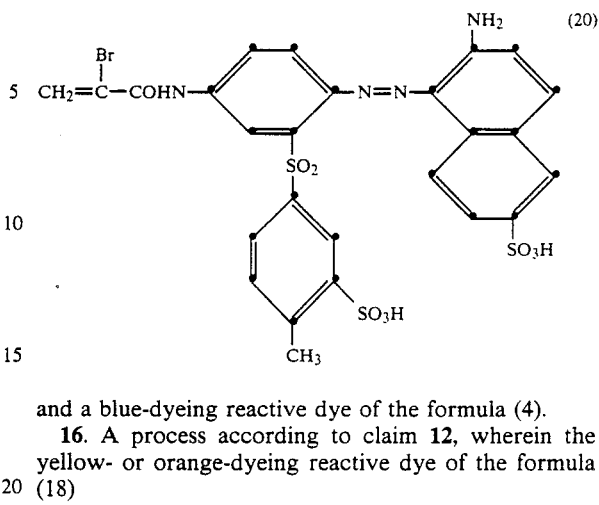

is used together with the red-dyeing reactive dye of the formula (20)

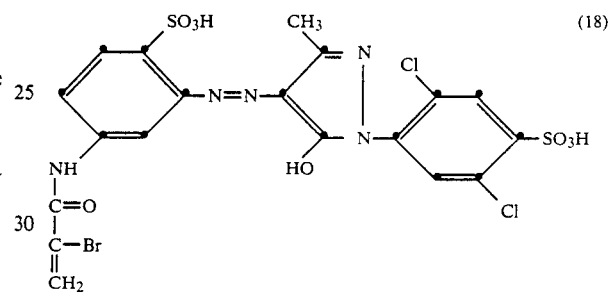

and a blue-dyeing reactive dye of the formula (5).

17. A process according to claim 4, wherein the fibre material used is wool.

18. The wool dyed or printed according to claim 5.